United States Patent [19]

Asai

[11] Patent Number: 5,171,482
[45] Date of Patent: Dec. 15, 1992

[54] SILICONE COMPOSITION WHICH DOES NOT CAUSE FAULTY CONDUCTION AT ELECTRICAL CONTACTS, AND METHOD FOR PREVENTING CONDUCTION FAULTS

[75] Inventor: Hiroyuki Asai, Chiba, Japan

[73] Assignee: Dow Corning Toray Silicone Co., LTD, Tokyo, Japan

[21] Appl. No.: 572,538

[22] Filed: Aug. 23, 1990

[30] Foreign Application Priority Data

Aug. 31, 1989 [JP] Japan .................. 1-225229

[51] Int. Cl.$^5$ .............................. H01B 3/20
[52] U.S. Cl. ................... 252/573; 524/233; 524/210; 252/571; 252/575; 252/77; 252/78.3; 252/500
[58] Field of Search .......... 252/573, 575, 77, 78.3, 252/500, 571; 524/233, 210

[56] References Cited

U.S. PATENT DOCUMENTS

| | | | |
|---|---|---|---|
| 3,996,184 | 12/1976 | Klosowski | 524/233 |
| 4,366,278 | 12/1982 | Hamada et al. | 524/233 |
| 4,454,276 | 6/1984 | Uda et al. | 524/210 |
| 4,467,395 | 8/1984 | Ross | 252/575 |
| 4,695,617 | 9/1987 | Inoue et al. | 528/32 |
| 4,935,165 | 6/1990 | Asai et al. | 252/575 |

FOREIGN PATENT DOCUMENTS

| | | |
|---|---|---|
| 181740 | 7/1987 | Japan . |
| 63-270762 | 11/1988 | Japan . |
| 01-104656 | 4/1989 | Japan . |
| 01-109615 | 4/1989 | Japan . |
| 01-024325 | 5/1989 | Japan . |

OTHER PUBLICATIONS

Organic Chemistry, R. Q. Brewster, 2 Edition, Prentice-Hall, Inc., 1953, p. 215, Section 16.
Denki Tsushin Gakkai Gijutsu Kenkyu Hokoku, (Technical Research Reports of the Institute of Electrical Communication Engineers of Japan), 76 (226), pp. 29–38, (1977).

*Primary Examiner*—John C. Bleutge
*Assistant Examiner*—Karen A. Hellender
*Attorney, Agent, or Firm*—Roger H. Borrousch

[57] ABSTRACT

A silicone composition containing a carboxylic acid amide which develops a vapor pressure during its use in an electrical device prevents faulty conduction at electrical contacts which are caused by silicone vapor. Electrical devices made by bringing the vapor of the carboxylic acid in the presence of the silicone vapor exhibit extended useful lives.

19 Claims, No Drawings

SILICONE COMPOSITION WHICH DOES NOT CAUSE FAULTY CONDUCTION AT ELECTRICAL CONTACTS, AND METHOD FOR PREVENTING CONDUCTION FAULTS

BACKGROUND OF THE INVENTION

1. Technical Field

The present invention relates to a silicone composition for use in the vicinity of electrical contacts in an open system or in sealed or semi-sealed electrical devices including electrical equipment and electronic devices which contain electrical contacts, and, for extended periods of time, will not cause conduction faults at electrical contacts caused by silicone vapor such as organosiloxane oligomer or cyclic siloxanes. The invention also relates to a method for preventing the conduction faults at electrical contacts which are caused by silicone vapor.

2. Prior Art

Various silicone products are used in electrical devices, electrical equipment, and electronic devices. For example, silicone oil is used as an electrical insulating oil in transformers and condensers; silicone greases and silicone compounds are used as lubricants, electrical insulation, and waterproofing agents; silicone resins and organosilanes are used as coatings; room temperature-curable silicone rubber compositions and low temperature-curing silicone rubber compositions are used as adhesives, sealants, casting agents, and coatings; silicone gel compositions are used as shock absorbers and casting agents; and thermosetting silicone rubber compositions are cured to give packings, O-rings, and electric wire coatings.

However, when such silicone products are used in the vicinity of electrical contacts in an open system (e.g., electrical switch contacts and electrical sliding contacts), or when they are used in sealed or semi-sealed electrical devices, electrical equipment, or electronic devices which contain electrical contacts, a decline in the conductivity of the electrical contacts is observed, and, in extreme cases, conduction may completely disappear. The electrical contact functionality is thus lost. The cause of this is that silicone products are typically based on organopolysiloxanes which are polymerized by equilibration polymerization and which thus contain residues of the starting material, as well as, volatile organosiloxane oligomer by-products. Moreover, another cause is that some silicone products are in fact based on volatile organosiloxane oligomer or organosilane, possibly in combination with organopolysiloxane. It is thought that the faulty conduction at the electrical contact is caused by the volatilization, at room or elevated temperature, of this organosilane or organosiloxane oligomer with a degree of polymerization (DP) of approximately 2 to 25. When this reaches the electrical contact, it undergoes a chemical change under the impact of the discharge energy generated upon operation of the contact and forms an insulating material such as silicon dioxide and silicon carbide, refer, for example, to Denki Tsushin Gakkai Gijutsu Kenkyu Hokoku, (Technical Research Reports of the Institute of Electrical Communication Engineers of Japan), 76 (226), pages 29–38, (1977).

The following means for solving this problem have been disclosed: equilibration-polymerized organopolysiloxane is heated in vacuo in order to thoroughly remove the contained organosiloxane oligomer; or the voltage and current loading conditions across the electrical contact are maintained within the limited range at which conduction faults do not occur, refer to Japanese Patent Application Laid Open [Kokai] Number 61-209266 [209,266/86], equivalent to U.S. Pat. No. 4,695,617, issued Sep. 22, 1987, to Inoue et al. Other proposals include compositions in which an amine or fluorinated organic compound is added to the silicone composition, refer to Japanese Patent Application Laid Open Number 63-270762 [270,762/88], published Nov. 8, 1988 and to Japanese Patent Application Laid Open Number 01-104656 [104,656/89], published Apr. 21, 1989, but also methods in which the presence of amine vapor or fluorinated organic compound vapor is induced in the silicone vapor, refer to Japanese Patent Application Laid Open Number 01-24325 [24,325/89], published Jan. 26, 1989 and Japanese Patent Application Laid Open Number 01-109615 [109,615/89], published Apr. 26, 1989.

PROBLEMS TO BE SOLVED BY THE INVENTION

Considering the thorough removal of organosiloxane oligomer by heating the organopolysiloxane in vacuo, this is technically difficult, and thorough removal entails very high costs. Furthermore, even when the organosiloxane oligomer has been thoroughly removed, organosiloxane oligomer may still be produced by depolymerization of the organopolysiloxane during its application due to the presence of additives or impurities, particularly when heated. Of course, in the case of an intentional mixture of organopolysiloxane and organosiloxane oligomer or organosilane, or when the composition is based on organosiloxane oligomer or organosilane, the high volatility of these organosiloxane oligomers and organosilanes makes it inappropriate to carry out thorough organosiloxane oligomer removal. Limiting the voltage and current loading conditions across the electrical contact raises the problem that device functionality may be compromised.

The use of an amine to solve this problem is itself problematic from a hygiene standpoint, while the use of a fluorinated organic compound is expensive and environmentally problematic. Furthermore, these two approaches are not always satisfactory in terms of achieving a long-term effect.

The present inventor carried out extensive investigations in order to develop a silicone composition which would not cause conduction faults at electrical contacts for even longer periods of time although the organosiloxane oligomer had not been stripped out; which would not cause conduction faults at electrical contacts for more extended periods of time even with the use of organopolysiloxane in combination with organosiloxane oligomer or organosilane or a composition actually based on organosiloxane oligomer or organosilane; and which would be nontoxic from a hygienic and environmental standpoint. Moreover, these investigations were also directed at developing a better method for preventing conduction faults which would be nontoxic from a hygienic and environmental standpoint. The present invention was developed based on the results of these investigations.

SUMMARY OF THE INVENTION

The present invention takes as its object the introduction of both a method and a silicone composition which, when used in the vicinity of electrical contacts in an open system or when used in sealed or semi-sealed electrical devices, electrical equipment, or electronic devices which contain electrical contacts, will not cause conduction faults at electrical contacts for long periods of time even without the removal of the organosiloxane oligomer and will not cause conduction faults at electrical contacts for long periods of time even for the use of combination of organopolysiloxane plus organosiloxane oligomer or organosilane or the use of a composition based on organosiloxane oligomer or organosilane.

The present invention relates to a silicone composition which does not cause faulty conduction at electrical contacts comprising silicone containing silicone vapor with a degree of polymerization of 2 to 25 and a carboxylic acid amide which develops a vapor pressure within use temperature of electrical device.

The present invention also relates to an electrical device comprising at least one electrical contact and silicone having present silicone vapor with a degree of polymerization of 2 to 25 where said silicone vapor can come into contact with at least one of the electrical contacts and cause faulty conduction wherein the improvement comprises there being in composition with the silicone a carboxylic acid amide which develops a vapor pressure within the temperature use of the electrical device.

The present invention also relates to a method for preventing conduction faults at electrical contacts which are caused by silicone vapor comprising bringing about in the silicone vapor the presence of vapor of a carboxylic acid amide during the use of an electrical device having at least one electrical contact wherein the silicone vapor is in combination with a silicone and has a degree of polymerization of 2 to 25, the carboxylic acid amide developing a vapor pressure at the use temperature of the electrical contact.

DESCRIPTION OF THE PREFERRED EMBODIMENTS

Within the context of the present invention, electrical contacts comprise not only contacts which open and close an electrical circuit by contact and separation movements (e.g., contacts in relays and switches) and contacts which switch an electric circuit by a sliding motion, but also the brushes and commutators of motors in which the current-flow circuit is switched by sliding accompanying motor rotation. The electrical devices include electrical equipment and electronic devices.

The silicone forming the basis for the present invention's silicone composition may be anything labeled as a silicone in the concerned art, such as organopolysiloxanes. Mixtures of two or more types of silicones may be used here, and mixtures with non-silicone components are also usable.

The organopolysiloxane may be a liquid, gum, soft solid, or solid at room temperature, and its molecular structure may be straight chain, branched chain, network, or cyclic. It may or may not contain reactive groups such the vinyl group, allyl group, silanol group, alkoxy group, hydrosilyl group, or mercaptoalkyl group. It may be a homopolymer or copolymer or a block copolymer with other polymers.

Monovalent hydrocarbon groups are typical examples of the organic groups in the organopolysiloxane bonded to the silicon atoms through a silicon-carbon linkage. Typical examples in this regard are methyl, ethyl, propyl, octyl, pheny, 2-phenylpropyl, and the aforesaid vinyl and allyl groups.

Silicones which consist of only organopolysiloxane are exemplified by diorganopolysiloxane oils e.g., trimethylsiloxy-terminated dimethylpolysiloxane oils, dimethylphenylsiloxy-terminated methylphenylpolysiloxane oils or dimethylphenylsiloxy-terminated dimethylsiloxane-methylphenylsiloxane copolymer oils, and trimethylsiloxy-terminated dimethylsiloxane-methyloctylsiloxane copolymer oils, and trimethylsiloxy-terminated dimethylsiloxane-methylsiloxane copolymer oils.

Silicones which are composed of organopolysiloxane and a non-silicone component are exemplified by silicone greases composed of diorganopolysiloxane oil and a metal soap such as a lithium soap;

silicone compounds composed of diorganopolysiloxane oil and a thickener such as fumed silica, zinc oxide powder, aluminum oxide powder, boron nitride, or carbon black;

thermosetting silicone rubber compositions which are composed of diorganopolysiloxane gum such as silanol-terminated dimethylpolysiloxane gum, dimethylvinylsiloxy-terminated dimethylpolysiloxane gum, dimethylvinylsiloxy-terminated dimethylsiloxane-methylphenylsiloxane copolymer gum, and dimethylvinylsiloxy-terminated dimethylsiloxane-methylvinylsiloxane copolymer gum, reinforcing filler such as fumed silica or precipitated silica, and organoperoxide;

low temperature-curing silicone gel compositions composed of vinyl-containing diorganopolysiloxane such as dimethylvinylsiloxy-terminated dimethylpolysiloxane, organohydrogenpolysiloxane, and platinum catalyst;

low temperature-curing silicone rubber compositions composed of vinyl-containing diorganopolysiloxane, organohydrogenpolysiloxane, platinum-type catalyst, and optional reinforcing filler;

thermosetting silicone resin compositions composed of silanol-containing organopolysiloxane resin and a condensation reaction catalyst such as a heavy metal carboxylate;

low temperature-curing silicone resin compositions composed of vinyl-containing organopolysiloxane resin, organohydrogenpolysiloxane, and platinum-type catalyst; and ultraviolet-curing organopolysiloxane compositions composed of vinyl-containing organopolysiloxane, organohydrogenpolysiloxane or mercaptoalkyl-containing organopolysiloxane, and sensitizer.

Silicones composed of organopolysiloxane, organosilane, and a non-silicone component are exemplified by room temperature-curable silicone rubber compositions composed of silanol-terminated diorganopolysiloxane, organosilane crosslinker such as methyltrimethoxysilane, methyltri(methyl ethyl ketoxime)silane, methyltriacetoxysilane, and vinyltri(isopropenoxy)silane, condensation reaction catalyst such as tetrabutyl titanate, dibutyltin dilaurate, and tin octoate, and optional filler such as fumed silica, fine quartz powder, titanium dioxide, calcium carbonate, and carbon black; and room temperature-curable silicone resin compositions composed of silanol group-containing organopolysiloxane resin, organosilane crosslinker, and condensation reaction catalyst.

Silicones composed of organopolysiloxane, organosiloxane oligomer, and a non-silicone component are exemplified by room temperature-curable silicone rubber compositions composed of silanol-terminated diorganopolysiloxane, the partial hydrolysis condensate of ethyl silicate, condensation reaction catalyst, and optional filler;

silicones in which a low-viscosity silicone oil (e.g., trimethylsiloxy-terminated dimethylsiloxane oligomer) is added to a thermosetting silicone rubber composition or low temperature-curable silicone rubber composition as described above in order to improve the release properties; and silicones in which a low-viscosity methylvinylsiloxane oligomer is added to a thermosetting silicone rubber composition or low temperature-curable silicone rubber composition as described above for reinforcement.

Silicones composed of organosilane and a non-silicone component are exemplified by coatings composed of tetraalkoxysilane, organotrialkoxysilane, and condensation reaction catalyst.

Some types of the above-described diorganopolysiloxane oils, diorganopolysiloxane gums, silanol-terminated diorganopolysiloxanes, vinyl-containing diorganopolysiloxanes, and organopolysiloxane resins are generally prepared by equilibration polymerization from diorganosiloxane oligomer with degree of polymerization (DP) of 2 to 6, for example, starting from cyclic diorganosiloxane oligomers, silanol-terminated diorganosiloxane oligomers, and hexaorganodisiloxanes, using an acid or base catalyst. As a result, they obligatorily contain approximately 5 to 10 weight % organosiloxane oligomer with DP of 2 to 25. This cannot be removed to a sufficient degree even by heating in vacuo, and 1 to 5 weight % will remain. DP is the number of diorganosiloxane units bonded together to make a organopolysiloxane, and in the present invention the number of diorganosiloxane units which make up the silicone vapor.

Among these organosiloxane oligomers, those lacking the silanol group, such as cyclic diorganosiloxane oligomers and triorganosiloxy-terminated diorganosiloxane oligomers, have relatively high vapor pressures. Among these molecules, not participating in the crosslinking reaction, volatilize at room temperature or upon heating to cause conduction faults at electrical contacts.

Moreover, in the case of the intentional addition of organosiloxane oligomer, non-crosslinking silanol-free material, such as the above-described low-viscosity silicone oils, may cause conduction faults at electrical contacts in a similar manner.

Even in the case of organosiloxane oligomer or organosilane which does participate in crosslinking, depending on the components of the silicone composition faulty conduction at electrical contacts may still be caused by their volatilization when they have a relatively high vapor pressure.

Silicone within the context of the present invention encompasses all silicones which contain these organosiloxane oligomers or organosilanes capable of causing conduction faults at electrical contacts, but also those silicones which, during the course of their application, can generate fault-inducing organosiloxane oligomer although it did not originally contain organosiloxane oligomer or organosilane capable of causing conduction faults at electrical contacts.

No particular restriction is placed on the type of carboxylic acid amide employed by the present invention, but examples in this regard are monoamides such as formamide, acetamide, propionamide, butyramide, benzamide, and acetoacetamide; diamides such as oxamide, malonamide, and succinamide; triamides such as the triamide of citric acid; compounds in which part or all of the nitrogen-bonded hydrogen atoms in the aforementioned carboxylic acid amides are substituted with hydrocarbon groups such as alkyl groups, cycloalkyl groups, or phenyl groups; and also secondary amides and tertiary amides.

It is essential that the carboxylic acid amide used within the context of the present invention develop a vapor pressure within the temperature range of use of the electrical device including electrical equipment and electronic device. As long as it exhibits a vapor pressure, it may be a liquid or solid at room temperature, but it is preferred that it be a liquid at room temperature or that it be a solid at room temperature which becomes a liquid at elevated temperatures. Unless it has a suitably high vapor pressure, its proportion in the organosiloxane oligomer or organosilane vapor may be too small. In contrast to this, when its vapor pressure is too high, it will be discharged too rapidly from the silicone composition or cured product therefrom, and it cannot then exercise its function (preventing conduction faults at electrical contacts) for extended periods of time. It is therefore preferred that the carboxylic acid amide have a vapor pressure of 0.001 to 100 torr at 25 degrees Centigrade. Operating on the above considerations, monocarboxylic acid amides represented by the following general formula

R, $R^1$, and $R^2$=hydrogen or $C_1$ to $C_5$ alkyl and dicarboxylic acid amides represented by the following general formula

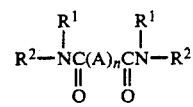

A=divalent $C_{1-4}$ aliphatic hydrocarbon group, n=zero or 1, $R^1$ and $R^2$ defined as above are preferred. Among these, formamide and compounds in which either $R^1$ or $R^2$ is alkyl are even more preferred. Secondary and tertiary amides as represented by the general formulas

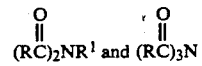

R and $R^1$ are defined as above may also be used, and cyclic carboxylic acid amides may also be employed.

The silicone composition should contain approximately 0.01 to 5 weight % carboxylic acid amide referred to the silicone, and 0.05 to 2 weight % is even more suitable. These content values apply to the silicone composition after heat treatment or thermosetting when it will be used after heat treatment or thermosetting. The carboxylic acid amide should be added in larger quantities in the case of larger contents of conduction fault-generating organosiloxane oligomer or organosilane, and in smaller quantities in the case of smaller contents. Furthermore, two or more types of carboxylic acid amides may be used in combination.

In addition to silicone and vapor pressure-developing carboxylic acid amide, the silicone composition of the present invention may contain non-silicone components as described above which are used in combination with silicone. It may also contain those non-silicone components typically used in silicone compositions, such as pigments, heat stabilizers, and flame retardants.

In order to bring about the presence of carboxylic acid amide vapor in the silicone vapor, the carboxylic acid amide may be placed in the silicone composition, but the following methods, given as examples, are also available.

In the case of electrical contacts in an open system

1. Vapor pressure-developing carboxylic acid amide is installed in the vicinity of the silicone, silicone composition, or cured product therefrom which is the source of the silicone vapor.

2. Vapor pressure-developing carboxylic acid amide is sprayed or coated on the silicone, silicone composition, or cured product therefrom which is the source of the silicone vapor.

3. Carboxylic acid amide vapor is sprayed on the silicone, silicone composition, or cured product therefrom which is the source of the silicone vapor.

4. Vapor pressure-developing carboxylic acid amide is adsorbed onto the cured silicone which is the source of the silicone vapor.

In the case of electrical contacts within a sealed or semi-sealed electrical device, electrical equipment, or electronic device which also contains a silicone vapor-generating silicone, silicone composition, or cured product therefrom 1. Vapor pressure-developing carboxylic acid amide is installed within the device or instrument.

2. Carboxylic acid amide vapor is fed into the device or instument.

3. Application of methods 2. to 4. listed above for electrical contacts in an open system.

The following methods may be used to install the vapor pressure-developing carboxylic acid amide:

said carboxylic acid amide may be installed or placed in an open container;

said carboxylic acid amide may be installed adsorbed or placed in a solid, for example, sponge, rubber, textiles, felt, mineral powder;

said carboxylic acid amide may be installed or mixed with a fluid, for example, organic solvents, mineral oil, greases. Furthermore, the installed carboxylic acid amide may be heated.

It remains unclear as to why faulty conduction at electrical contacts may be averted for long periods of time by placing carboxylic acid amide in the silicone composition or by bringing about the presence of carboxylic acid amide vapor in the silicone vapor. However, it is thought that the carboxylic acid amide gradually evaporates from the silicone composition, cured product therefrom, or carboxylic acid amide-containing material, that its vapor is decomposed by electrical energy at the surface of the electrical contacts, and that this decomposition product inhibits conversion of the simultaneously evaporated organosiloxane oligomer or organosilane into silica or silicon carbide.

The silicone composition of the present invention is simply and easily prepared by mixing silicone with a vapor pressure-developing carboxylic acid amide; or by admixing a vapor pressure-developing carboxylic acid amide into a silicone composition already prepared from silicone and non-silicone components other than the vapor pressure-developing carboxylic acid amide; or by mixing silicone, vapor pressure-developing carboxylic acid amide, and non-silicone components other than the vapor pressure-developing carboxylic acid amide. This mixing may be carried out with moderate heating, with the addition of organic solvent, or in an emulsified state.

The silicone composition of the present invention, either directly or after curing, is highly qualified for use in the vicinity of electrical contacts in open systems, and, in the form of various materials (for example, electrical-insulating materials, conductive materials, protective coatings, adhesives, sealants, lubricants), is highly qualified for use in sealed or semi-sealed electrical devices, electrical instruments, and electronic devices which contain electrical contacts. When the silicone composition of the present invention is heat treated or thermoset, conditions must be selected which minimize volatilization or scatter of the carboxylic acid amide.

EXAMPLES

The present invention is explained below with reference to illustrative examples. The following applies in the examples and comparison examples: parts=weight parts, the viscosity and plasticity were measured at 25 degrees Centigrade, $D_4$=cyclic dimethylsiloxane tetramer, $D_{10}$=cyclic dimethylsiloxane decamer, $D_{21}$=cyclic dimethylsiloxane 21-mer, and $D_{24}$ and $D_{25}$ are defined similarly. A load switching test was conducted on electrical switch contacts as follows.

Sealed System Load Switching Test Method for Electrical Switch Contacts

A microrelay with 8 electrical switch contacts was installed in a sealable 1 L container, and a device was set up which could operate these contacts from the outside. 5 Grams silicone composition or cured product therefrom was placed in the container, the container was then sealed, and an electrical switching test was conducted under the following conditions.

| | |
|---|---|
| voltage across each contact: | 24 volts DC |
| load across each contact: | 200 ohms (R load) |
| switching frequency for each contact: | 5 cycles per second (5 Hz) |
| testing temperature: | 70 degrees Centirade |

The contact resistance at each contact was measured using the voltage-drop method and was recorded with a multipen recorder. Contact failure was scored when the contact resistance value reached 10 ohms. The contact life was defined as the number of contact switching cycles until contact failure. The number of switching cycles to the first failure among the eight contacts was defined as the first failure life, and the number of switching cycles until the failure of 4 contacts was defined as the 50% failure life.

Semi-Sealed System Load Switching Test Method for Electrical Switch Contacts

This test was conducted the same as for the above-described sealed system load switching test for electrical switch contacts, with the single exception that the instant test used a container having two holes (1 cm diameter) placed symmetrically at the centers of the sides in place of the sealable 1 L container used in the above-described sealed system load switching test for electrical switch contacts.

EXAMPLES 1 and 2

100 Parts hydroxyl-terminated dimethylpolysiloxane (viscosity=4,000 centistokes, $D_4$ to $D_{10}$ content=0.76 weight %, $D_4$ to $D_{25}$ content=2.0 weight %), 4 parts ethyl silicate, and 0.4 parts dibutyltin dilaurate were mixed to homogeneity to afford a condensation-reacting room temperature-curable silicone rubber composition. With regard to the carboxylic acid amide, compounds as reported in Table 1 were respectively added in the quantities reported in Table 1 followed by mixing to homogeneity.

Each obtained mixture was coated on a teflon sheet and cured by standing for 24 hours at room temperature. The obtained cured silicone rubber sheets were subjected to the sealed system load switching test on electrical switch contacts, and the results are reported in Table 1 as Examples 1 and 2.

For comparison, the condensation-reacting room temperature-curable silicone rubber composition described above was cured as above without the addition of any carboxylic acid amide. This was then tested by the same load switching test on electrical switch contacts, and these results are also reported in Table 1 as Comparison Example 1.

TABLE 1

| COMPOSITION AND FAILURE LIVES | Example 1 | Example 2 | Comparison Example 1 |
|---|---|---|---|
| hydroxyl-terminated dimethyl-polysiloxane | 100 | 100 | 100 |
| ethyl silicate | 4 | 4 | 4 |
| dibutyltin dilaurate | 0.5 | 0.5 | 0.5 |
| N,N-diethylformamide | 0.5 | — | — |
| N,N-dimethylacetamide | — | 0.3 | — |
| first failure life (cycles) | 206300 | 236200 | 19300 |
| 50% failure life (cycles) | 382400 | 404700 | 35500 |

EXAMPLES 3 and 4

100 Parts hydroxyl-terminated dimethylpolysiloxane (viscosity=12,000 centistokes, $D_4$ to $D_{10}$ content=0.62 weight %, $D_4$ to $D_{24}$ content=2.2 weight %), 5 parts of the methyltrioximesilane reported in Table 2, and 0.5 parts dibutyltin dilaurate catalyst were mixed to homogeneity to afford a condensation-reacting room temperature-curable silicone rubber composition. To this composition was added, with mixing to homogeneity, carboxylic acid amide as reported in Table 2 in the quantity reported in Table 2. The obtained mixtures were respectively coated on teflon sheets and cured by standing at room temperature for 100 hours. The obtained cured silicone rubber sheets were then subjected to the sealed system load switching test on electrical switch contacts, and the obtained results are reported in Table 2 as Examples 3 and 4.

For comparison, the condensation-reacting room temperature-curable silicone rubber composition described above was cured as above without the addition of any carboxylic acid amide. This was then tested by the same load switching test on electrical switch contacts, and these results are also reported in Table 2 as Comparison Example 2.

TABLE 2

| COMPOSITION AND FAILURE LIVES | Example 3 | Example 4 | Comparison Example 2 |
|---|---|---|---|
| hydroxyl-terminated dimethylpolysiloxane | 100 | 100 | 100 |
| $CH_3Si[ON=C(C_2H_5)(CH_3)]_3$ | 5 | 5 | 5 |
| dibutyltin dilaurate | 0.5 | 0.5 | 0.5 |
| N,N-dimethylpropionamide | 0.2 | — | — |
| N-ethylformamide | — | 0.5 | — |
| first failure life (cycles) | 233100 | 163800 | 21300 |
| 50% failure life (cycles) | 401300 | 281200 | 38200 |

EXAMPLES 5 AND 6

100 Parts dimethylvinylsiloxy-terminated dimethylpolysiloxane (viscosity=2,000 centistokes, $D_4$ to $D_{10}$ content=1.3 weight %, $D_4$ to $D_{25}$ content=2.1 weight %), 3 parts trimethylsiloxy-terminated methylhydrogenpolysiloxane (viscosity=10 centistokes), and 0.1 part divinyltetramethyldisiloxane were mixed by stirring, followed by the addition with mixing of an ethanolic chloroplatinic acid solution (platinum weight=15 ppm based on the total polysiloxane quantity) as catalyst to afford an addition-reacting curable organopolysiloxane composition. To this composition was added, with mixing to homogeneity, carboxylic acid amide as reported in Table 3 in the quantity reported in Table 3. The obtained mixture was cured by maintenance at room temperature for 24 hours. The resulting cured silicone rubber was subjected to the sealed system load switching test on electrical switch contacts according to the method described above, and these results are reported in Table 3 as Examples 5 and 6.

For comparison, the addition-reacting curable organopolysiloxane composition described above was cured as above without the addition of any carboxylic acid amide. The obtained cured silicone rubber was then tested by the same load switching test on electrical switch contacts, and these results are also reported in Table 3 as Comparison Example 3.

TABLE 3

| COMPOSITION AND FAILURE LIVES | Example 5 | Example 6 | Comparison Example 3 |
|---|---|---|---|
| dimethylvinylsiloxy-terminated dimethylpolysiloxane | 100 | 100 | 100 |
| trimethylsiloxy-terminated methylhydrogenpolysiloxane | 3 | 3 | 3 |
| chloroplatinic acid (as quantity of platinum) | (15 ppm) | (15 ppm) | (15 ppm) |
| divinyltetramethyldisiloxane | 0.1 | 0.1 | 0.1 |
| N-methylpropionamide | 0.3 | — | — |
| N,N-diethylacetamide | — | 0.5 | — |
| first failure life (cycles) | 283700 | 224300 | 20400 |
| 50% failure life (cycles) | 374600 | 306600 | 29300 |

EXAMPLE 7

0.5 Parts N,N-diethylformamide as the carboxylic acid amide was added with mixing to homogeneity to 100 parts trimethylsiloxy-terminated dimethylpolysiloxane oil (viscosity=2,000 centistokes, $D_4$ to $D_{10}$ content=1.2 weight %, $D_4$ to $D_{25}$ content=2.4 weight %), and 5 g of the obtained mixture was placed in a laboratory dish. This was then placed and sealed in a test container and subjected to the sealed system load switching test on electrical switch contacts, the results of which are reported in Table 4 as Example 7. For comparison, the trimethylsiloxy-terminated dimethylpolysiloxane oil alone was subjected to the same load switching test on electrical switch contacts, and these results are also reported in Table 4 as Comparison Example 4.

TABLE 4

| COMPOSITION AND FAILURE LIVES | Example and Comparison Example | |
|---|---|---|
| | Example 7 | Comparison Example 4 |
| trimethylsiloxy-terminated dimethylpolysiloxane oil | 100 | 100 |
| N,N-diethylformamide | 0.5 | — |
| first failure life (cycles) | 622500 | 7800 |
| 50% failure life (cycles) | 799800 | 12300 |

EXAMPLE 8

A cured silicone rubber sheet prepared as in Example 1 was subjected to the semi-sealed system load switching test on electrical switch contacts, and these results are reported in Table 5. For comparison, a cured silicone rubber sheet prepared as in Comparison Example 1 was subjected to the semi-sealed system load switching test on electrical switch contacts, and these results are reported in Table 5 as Comparison Example 5.

TABLE 5

| FAILURE LIVES | Example and Comparison Example | |
|---|---|---|
| | Example 8 | Comparison Example 5 |
| first failure life (cycles) | 462700 | 41300 |
| 50% failure life (cycles) | 882500 | 68400 |

EXAMPLES 9 and 10

5 Grams trimethylsiloxy-terminated dimethylpolysiloxane oil (viscosity=2,000 centistokes, $D_4$ to $D_{10}$ content=0.8 weight %, $D_4$ to $D_{25}$ content=1.5 weight %) and, as the carboxylic acid amide, 5 g of a compound as reported in Table 6, were placed in separate laboratory dishes, which were then placed in a container for sealed system load switching testing. After sealing, sealed system load switching testing on electrical switch contacts was conducted, and these results are reported in Table 6.

For comparison, the carboxylic acid amide was omitted and only the preceding dimethylpolysiloxane oil was placed in the sealed system load switching test container. After sealing, load switching testing on electrical switch contacts was carried out, and these results are also reported in Table 6 as Comparison Example 6. Table 6 makes it clear that, when the vapor of a carboxylic acid amide is present in the cyclic dimethylsiloxane oligomer vapor, the contact failure life is substantially extended over the situation prevailing when the electrical switch contacts are in contact with only the cyclic dimethylsiloxane oligomer vapor which has evaporated from the dimethylpolysiloxane oil.

TABLE 6

| | Samples and failure lives | | | |
|---|---|---|---|---|
| | Samples | | Failure Life (cycles) | |
| | Silicone Composition | Amide | first failure life | 50% failure life |
| Examples | | | | |
| 9 | trimethylsiloxy-terminated dimethylpolysiloxane oil | N-methylpropionamide | 553200 | 802700 |
| 10 | trimethylsiloxy-terminated dimethylpolysiloxane oil | formamide | 374500 | 564400 |
| Comparison Example 6 | trimethylsiloxy-terminated dimethylpolysiloxane oil | none | 12300 | 23600 |

EXAMPLE 11

A butyl rubber sheet (50×50×2 mm) was immersed for one week in N-ethylacetamide heated to 50 degrees Centigrade. It was then removed and its surface was wiped clean. This sample and 5 g silicone rubber (1) ($D_4$ to $D_{10}$ content=1.0 weight %, $D_4$ to $D_{25}$ content=2.1 weight %) were then placed in a test container. Silicone rubber (1) was obtained by the room temperature curing of a room temperature-curable organopolysiloxane composition composed of 100 parts hydroxyl-terminated dimethylpolysiloxane (viscosity=12,000 centistokes), 5 parts methyltri(methyl ethyl ketoxime)silane, and 0.5 parts dibutyltin dilaurate. After sealing, the sealed system load switching test on electrical switch contacts was carried out, and the obtained results are reported in Table 7 as Example 11.

In the test of Comparison Example 7, 5 g of the room temperature-cured silicone rubber (1) and a butyl rubber sheet (50×50×2 mm) identical to the preceding, but not immersed in N-ethylacetamide, were sealed in the test container. The load switching test on electrical switch contacts was carried out as above, and these results are also reported in Table 7 as Comparison Example 7.

TABLE 7

| | Samples and failure lives | | | |
|---|---|---|---|---|
| | Samples | | Failure Life (cycles) | |
| | Silicone Composition | Amide | first failure life | 50% failure life |
| Example 11 | room temperature-cured silicone rubber (1) | butyl rubber containing N-ethylacetamide | 362400 | 584100 |
| Comparison Example 7 | room temperature-cured silicone rubber (1) | none | 14200 | 22100 |

Effects of the Invention

Because the silicone composition of the present invention is based on silicone and contains a carboxylic acid amide which develops a vapor pressure, when used directly or after curing in the vicinity of electrical contacts in an open system or in sealed or semi-sealed electrical devices including electrical equipment and electronic devices which contain electrical contacts, it characteristically will not cause for extended periods of time those conduction faults at electrical contacts which may be caused by the vapor of contained organosiloxane oligomer or the vapor of contained organosilane.

Moreover, the method of the present invention, in which the presence of the vapor of a carboxylic acid amide in silicone vapor is brought about, characteristically prevents silicone vapor-induced conduction faults at electrical contacts for extended periods of time.

That which is claimed is:

1. A silicone composition which does not cause faulty conduction at electrical contacts comprising
    silicone containing silicone vapor with a degree of polymerization of 2 to 25 and
    a carboxylic acid amide selected from the group consisting of N,N-diethylformamide, N,N-dimethylacetamide, N,N-dimethylpropionamide, N-ethylformamide, N-methylpropionamide, N-ethylacetamide, and formamide.

2. The silicone composition according to claim 1 in which the carboxylic acid amide is N,N-diethylformamide.

3. The silicone composition according to claim 1 in which the carboxylic acid amide is N,N-dimethylacetamide.

4. The silicone composition according to claim 1 in which the carboxylic acid amide is N,N-dimethylpropionamide.

5. The silicone composition according to claim 1 in which the carboxylic acid amide is N-ethylformamide.

6. The silicone composition according to claim 1 in which the carboxylic acid amide is N-methylpropionamide.

7. The silicone composition according to claim 1 in which the carboxylic acid amide is N-ethylacetamide.

8. The silicone composition according to claim 1 in which the carboxylic acid amide is formamide.

9. An electrical device comprising at least one electrical contact and a silicone composition having present silicone vapor with a degree of polymerization of 2 to 25 where said silicone vapor can come into contact with at least one of the electrical contacts and cause faulty conduction wherein the improvement comprises there being in combination with the silicone vapor, a carboxylic acid amide selected from the group consisting of N,N-diethyl formamide, N,N-dimethylacetamide, N,N-dimethylpropionamide, N-ethyl formamide, N-ethylacetamide, and formamide.

10. A method for preventing conduction faults at electrical contacts which are caused by silicone vapor from a silicone composition comprising bringing about silicone vapor in combination with vapor of a carboxylic acid amide during the use of an electrical device having at least one electrical contact, wherein the silicone vapor has a degree of polymerization of 2 to 25, and the carboxylic acid amide selected from the group consisting of N,N-diethyl formamide, N,N-dimethylacetamide, N,N-dimethylpropionamide, N-ethyl formamide, N-ethylacetamide, and formamide.

11. The method in accordance with claim 10 in which the carboxylic acid amide is present in an amount of 0.01 to 5 weight percent based on the weight of the silicone composition.

12. The method in accordance with claim 11 in which the carboxylic acid amide is present in an amount of from 0.05 to 2 weight percent based on the weight of the silicone composition.

13. The method in accordance with claim 12 in which the carboxylic acid amide is N,N-diethylformamide.

14. The method in accordance with claim 12 in which the carboxylic acid amide is N,N-dimethylacetamide.

15. The method in accordance with claim 12 in which the carboxylic acid amide is N,N-dimethylpropionamide.

16. The method in accordance with claim 12 in which the carboxylic acid amide is N-ethylformamide.

17. The method in accordance with claim 12 in which the carboxylic acid amide is N-methylpropionamide.

18. The method in accordance with claim 12 in which the carboxylic acid amide is N-ethylacetamide.

19. The method in accordance with claim 12 in which the carboxylic acid amide is formamide.

* * * * *